United States Patent
Oshiba

(10) Patent No.: US 7,359,327 B2
(45) Date of Patent: Apr. 15, 2008

(54) RADIO COMMUNICATION SYSTEM, BASE STATION, METHOD OF CORRECTING RADIO LINK QUALITY INFORMATION EMPLOYED THEREFOR, AND ITS PROGRAM

(75) Inventor: Shigeomi Oshiba, Tokyo (JP)

(73) Assignee: NEC Corporation, Tokyo (JP)

( * ) Notice: Subject to any disclaimer, the term of this patent is extended or adjusted under 35 U.S.C. 154(b) by 729 days.

(21) Appl. No.: 10/806,435

(22) Filed: Mar. 23, 2004

(65) Prior Publication Data

US 2004/0190486 A1    Sep. 30, 2004

(30) Foreign Application Priority Data

Mar. 26, 2003    (JP) .............................. 2003/084037

(51) Int. Cl.
*H04L 1/00* (2006.01)
*H04L 1/18* (2006.01)
*H04J 3/16* (2006.01)

(52) U.S. Cl. ...................... 370/235; 370/252; 370/465; 714/748

(58) Field of Classification Search ...................... None
See application file for complete search history.

(56) References Cited

U.S. PATENT DOCUMENTS

| 2002/0147953 | A1 | 10/2002 | Catreux et al. | |
|---|---|---|---|---|
| 2003/0112744 | A1* | 6/2003 | Baum et al. | 370/206 |
| 2003/0126536 | A1* | 7/2003 | Gollamudi et al. | 714/748 |
| 2004/0131016 | A1* | 7/2004 | Hundal et al. | 370/252 |
| 2004/0203992 | A1* | 10/2004 | Yun | 455/522 |
| 2006/0120282 | A1* | 6/2006 | Carlson et al. | 370/229 |

FOREIGN PATENT DOCUMENTS

| EP | 1 227 603 A1 | 7/2002 |
|---|---|---|
| EP | 1 513 282 A2 | 3/2005 |
| WO | WO 03/019376 | 3/2003 |

OTHER PUBLICATIONS

Chinese Office Action dated Mar. 31, 2006, with English-Language Translation.
3rd Generation Partnership Project; Technical Specification Group Radio Access Network; Physical layer procedures (FDD) (Release 5), 3GPP TS 25.214 V5.3.0 (Dec. 2002), pp. 36-42, Chapter 6A.
3rd Generation Partnership Project; Technical Specification Group Radio Access Network; Requirements for Support of Radio Resource Management (FDD) (Release 5), 3GPP TS 25.133 V5.5.0 (Dec. 2002), pp. 58-62, Chapter 9.1.1 and 9.1.2.

* cited by examiner

*Primary Examiner*—Andrew C. Lee
(74) *Attorney, Agent, or Firm*—McGinn IP Law Group, PLLC

(57) ABSTRACT

A mobile communication system is provided which is capable of preventing a reduction in user throughput and system throughput. In a radio base station, a dataflow control unit controls an Iub dataflow from an RNC, a buffer stores the dataflow for each terminal in each corresponding queue, and a scheduler schedules the dataflow. An HARQ control unit controls retransmission of the dataflow and corrects CQI report values received from a terminal at a corrector. An encoding processor encodes the dataflow, and a demodulator demodulates data received from the terminal. After the demodulation of the data received from the terminal, the demodulator sends CQI information and Ack/Nack information to the HARQ control unit. The corrector in the HARQ control unit then corrects the CQI report value in accordance with these received CQI information and Ack/Nack information.

7 Claims, 15 Drawing Sheets

FIG. 16

| CQI VALUE | TRANSPORT BLOCK SIZE | NUMBER OF HS-PDSCH | MODULATION |
|---|---|---|---|
| 0 | N/A | \multicolumn{2}{c} OUT OF RANGE | |
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |
| 14 | 2583 | 4 | QPSK |
| 15 | 3319 | 5 | QPSK |
| 16 | 3565 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |
| 22 | 7168 | 5 | 16-QAM |
| 23 | 9719 | 7 | 16-QAM |
| 24 | 11418 | 8 | 16-QAM |
| 25 | 14411 | 10 | 16-QAM |
| 26 | 17300 | 12 | 16-QAM |
| 27 | 21754 | 15 | 16-QAM |
| 28 | 23370 | 15 | 16-QAM |
| 29 | 24222 | 15 | 16-QAM |
| 30 | 25558 | 15 | 16-QAM |

RADIO COMMUNICATION SYSTEM, BASE STATION, METHOD OF CORRECTING RADIO LINK QUALITY INFORMATION EMPLOYED THEREFOR, AND ITS PROGRAM

BACKGROUND OF THE INVENTION

1. Field of the Invention

The present invention relates to a radio communication system, base station, method of correcting radio link quality information employed therefor, and its program, and more particularly, to a method of correcting radio link quality information informed by mobile stations or terminals to a radio base station.

2. Description of the Prior Art

Data traffic in a mobile communication network has been predicted to show a significant increase as expected in a fixed communication network, a countermeasure against which has been discussed especially for downlink traffic (base station→mobile station: terminal) associated with, for example, downloading from a server.

As one example, HSDPA (High Speed Downlink Access) has been standardized in W-CDMA (Wideband-Code Division Multiple Access).

HSDPA implementations include HARQ (Hybrid Automatic Repeat reQuest) for controlling retransmission. Also, for more efficient control over changes in radio link quality, HSDPA uses methods of time/code multiplexing to achieve transmission of downlink data from a radio base station to a large number of terminals using a common channel.

In addition, HSDPA has a scheduling technique based on radio link qualities of a number of terminals, so that a terminal assigned with a transmission opportunity according to scheduling can receive packet data transmitted with a transmission parameter and transmission power that are set based on the radio link quality of this terminal. The transmission parameter mentioned herein includes the number of Codes, data size, modulation scheme, and the like.

HSDPA employing these techniques uses a common channel by time/code multiplexing to transmit packet data to a number of terminals of various radio wave environments, which means that the more target terminals, the higher system throughput is expected by virtue of a statistical multiplexing effect.

In HSDPA, the radio base station determines the transmission parameter and transmission power of an HS-PDSCH (High Speed-Physical Downlink Shared Channel) which is a common channel used to transmit an allocation schedule of transmission opportunity and packet data.

In order to determine these transmission parameter and transmission power, the radio base station needs to recognize the radio link quality of each terminal. This radio link quality is indicated by CQI (Channel Quality Indicator) information transmitted over an HS-DPCCH (High Speed-Dedicated Physical Control Channel) which is an HSDPA uplink physical channel.

Each terminal measures a reception level of a CPICH (Common Pilot Channel) in an HSDPA Serving Cell, and based on the measured reception level each terminal estimates a transmission parameter by which PER (Packet Error Rate) of the HS-PDSCH becomes "0.1" at the time when the radio base station transmits packet data with HS-PDSCH transmission power of (CPICH)+(known offset value), and then informs the radio base station of the estimate as the CQI information. The known offset value is informed to the radio base station from an upper station (RNC).

By referring to the CQI information informed by the terminal, the radio base station can obtain the transmission parameter of the terminal. The CQI information holds fixed values as shown in FIG. 16 (e.g., see Non-Patent Document 1). In this drawing, a parameter of each CQI value (0 to 30) corresponds to 1 dB step.

The terminal estimates the CQI information according to the following procedures: (1) measurement of the CPICH reception level, (2) estimation of ratio between the measured reception level and interference power [SIR (Signal Interference Ratio)], and (3) notification of the largest CQI value to obtain the PER of HS-DSCH smaller than "0.1".

The estimation of CPICH reception level includes, for example, CPICH_RSCP (CPICH Received Signal Code Power) measurement of which absolute accuracy requirements range from ±6 to ±11 dB (e.g., see Non-Patent Document 2).

Since the terminal uses the reception level having such an error range to inform of the CQI value that leads to PER of HS-PDSCH (Packet Error Rate of HS-PDSCH) of "0.1", a measurement error of downlink reception level probably directly affects the CQI value.

FIG. 17 shows a curve of SNR (Signal Noise Ratio)-Log10 (PER) with respect to each CQI value (1 to 30). As is observed from FIG. 17, high sensitivity is shown at PER=0.1 [10Log (PER) =−10] in response to SNR fluctuations in the horizontal axis.

Non-Patent Document 1

3GPP ($3^{rd}$ Generation Partnership Project) TS25.214, V5.3.0 (2002-12), Chapter 6A Non-Patent Document 2

3GPP, TS 25.133, V5.5.0 (2002-12), Chapters 9.1.1 and 9.1.2

In the foregoing conventional method of informing of radio link quality, when a CQI report value of a given terminal #k is informed higher than the actual CQI value, the terminal #k exhibits an extremely large PER and user throughput is substantially reduced.

In contrast, when the CQI report value is informed lower than the actual CQI value, excessive code and power resources are used for the terminal #k, which causes reduction in system throughput.

The scheduling is based on the CQI report value in HSDPA, therefore requiring high accuracy for the CQI report value. The radio base station thus needs to correct the CQI report value informed by each terminal.

In other words, the conventional method of radio link quality informing uses a radio communication channel with limited code or power resources to transmit packet data. Therefore, the inaccurate report of radio link quality may lead to excessive resource allocation thereby reducing system throughput, or lead to discard of packet data due to insufficient resource allocation thereby reducing user throughput.

BRIEF SUMMARY OF THE INVENTION

The present invention has therefore been proposed to solve the conventional problem, and has an object to provide a radio communication system, base station, method of correcting radio link quality information employed therefor, and its program, all of which are capable of preventing reduction in both user throughput and system throughput.

The present invention is directed to a radio communication system in which data transmitting and receiving is achieved between a base station and a mobile station based on radio link quality and data delivery confirmation informed from the mobile station to the base station. The base station comprises means for correcting the radio link quality in accordance with an expectation value of a packet error rate of packet data to be transmitted to the mobile station and a packet error rate of packet data actually received by the mobile station.

The present invention is also directed to a base station for transmitting and receiving data to and from a mobile station based on radio link quality and data delivery confirmation informed by the mobile station. The base station comprises means for correcting the radio link quality in accordance with an expectation value of a packet error rate of packet data to be transmitted to the mobile station and a packet error rate of packet data actually received by the mobile station.

The present invention is further directed to a method of correcting radio link quality information employed in a radio communication system in which data communication is achieved between a base station and a mobile station based on radio link quality and data delivery confirmation informed from the mobile station to the base station. The method comprises a step executed by the base station of correcting the radio link quality in accordance with an expectation value of a packet error rate of packet data to be transmitted to the mobile station and a packet error rate of packet data actually received by the mobile station.

The present invention is yet further directed to a program for a method of correcting radio link quality information employed in a radio communication system in which data communication is achieved between a base station and a mobile station based on radio link quality and data delivery confirmation informed from the mobile station to the base station. The program causes a computer to execute a step of correcting the radio link quality in accordance with an expectation value of a packet error rate of packet data to be transmitted to the mobile station and a packet error rate of packet data actually received by the mobile station.

The radio communication system according to the present invention provides a method of preventing a reduction of system throughput in a radio communication system employing HARQ (Hybrid Automatic Repeat reQuest) for a radio link, by correcting radio link quality (CQI: Channel Quality Indicator) using an expectation value of packet error rate of packet data to be transmitted to a mobile station and a PER (Packet Error Rate) of actually received packet data.

More specifically, the radio communication system of the present invention is so configured as to correct the radio link quality using a probability (if known in advance) that CRC (Cyclic Redundancy Check) of transmitted packet data results in OK/NG (expectation value of packet error rate), therefore making it possible to prevent reduction in each user throughput and system throughput.

BRIEF DESCRIPTION OF THE DRAWINGS

FIG. 16 is a diagram showing one example of a CQI table; and

DETAILED DESCRIPTION OF THE PREFERRED EMBODIMENTS

Figure 1:
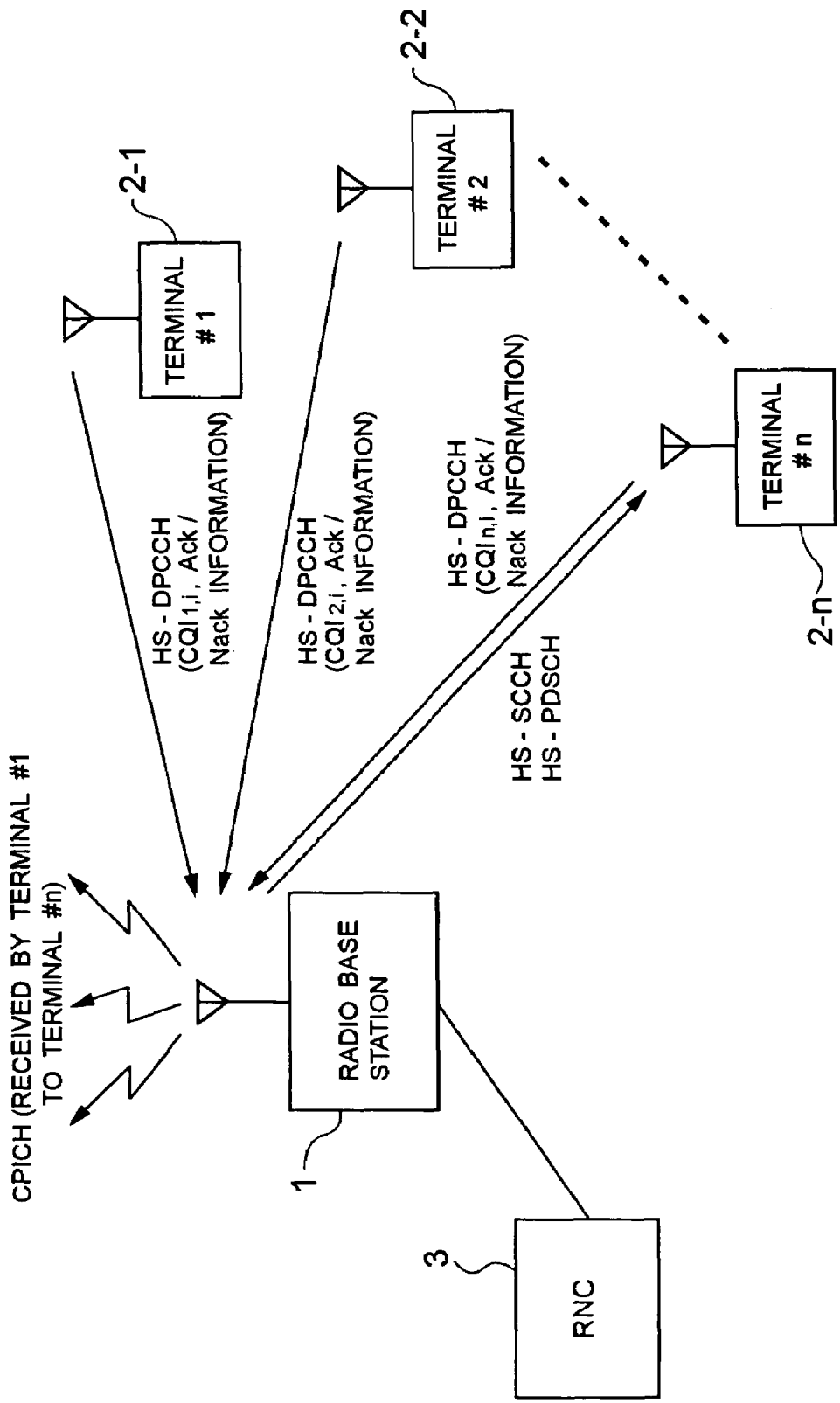
FIG. 1 is a block diagram showing a structure of a radio communication system according to one embodiment of the present invention.

Preferred embodiments of the present invention will be described below with reference to the drawings. FIG. 1 is a block diagram showing a structure of a radio communication system according to one embodiment of the present invention, and shows a relation between a radio base station 1 and terminals (#1 to #n) 2-1 to 2-n. The radio base station 1 is connected to an RNC (Radio Network Controller) 3.

The radio base station 1 outputs a common channel of CPICH (Common Pilot Channel) with a constant transmission power. Each terminal (#1 to #n) 2-1 to 2-n measures a reception power of this CPICH and informs the radio base station 1 of radio link quality (CQI: Channel Quality Indicator) in the downlink by transmitting it over uplink HS-DPCCH (High Speed-Dedicated Physical Control Channel). FIG. 1 shows packet data transmission from the radio base station 1 to the terminal (#n) 2-n.

The radio base station 1 sends, prior to packet data transmission, a control signal called an HS-SCCH (High Speed-Shared Common Channel) to the terminal (#n) 2-n so that the terminal (#n) 2-n can recognize that packet data directed thereto is transmitted over an HS-PDSCH (High Speed-Physical Downlink Shared Channel).

The HS-SCCH contains a transmission parameter of the HS-PDSCH (High Speed-Physical Downlink Shared Channel). The transmission parameter contains the number of Codes, data size, modulation scheme, and the like so that the terminal (#n) 2-n can demodulate and decode HS-PDSCH (packet data) directed thereto in accordance with the parameter informed by HS-SCCH.

After decoding the packet data, the terminal (#n) 2-n checks using CRC (Cyclic Redundancy Check) added within the data whether the CRC is OK or not.

For example, assuming that the terminal (#n) 2-n is supposed to inform the radio base station 1 of CQI information that leads to "PER expectation value of packet data (represented by "PER_exp" hereinafter)=0.1", the radio base station 1 allocates to the relevant terminal (#n) 2-n a transmission parameter and transmission power that are set according to the CQI report value, so as thereby to treat the PER expectation value of packet data (known probability) as "P(OK)=0.9" and "P(NG)=0.1".

In order to ensure the reliability of PER obtained from actually received packet data, repetitive reception of packet data over a certain number of times is required. This embodiment deals with a method of correcting the CQI report value using both the PER expectation value and the PER of actually received packet data.

Figure 2:
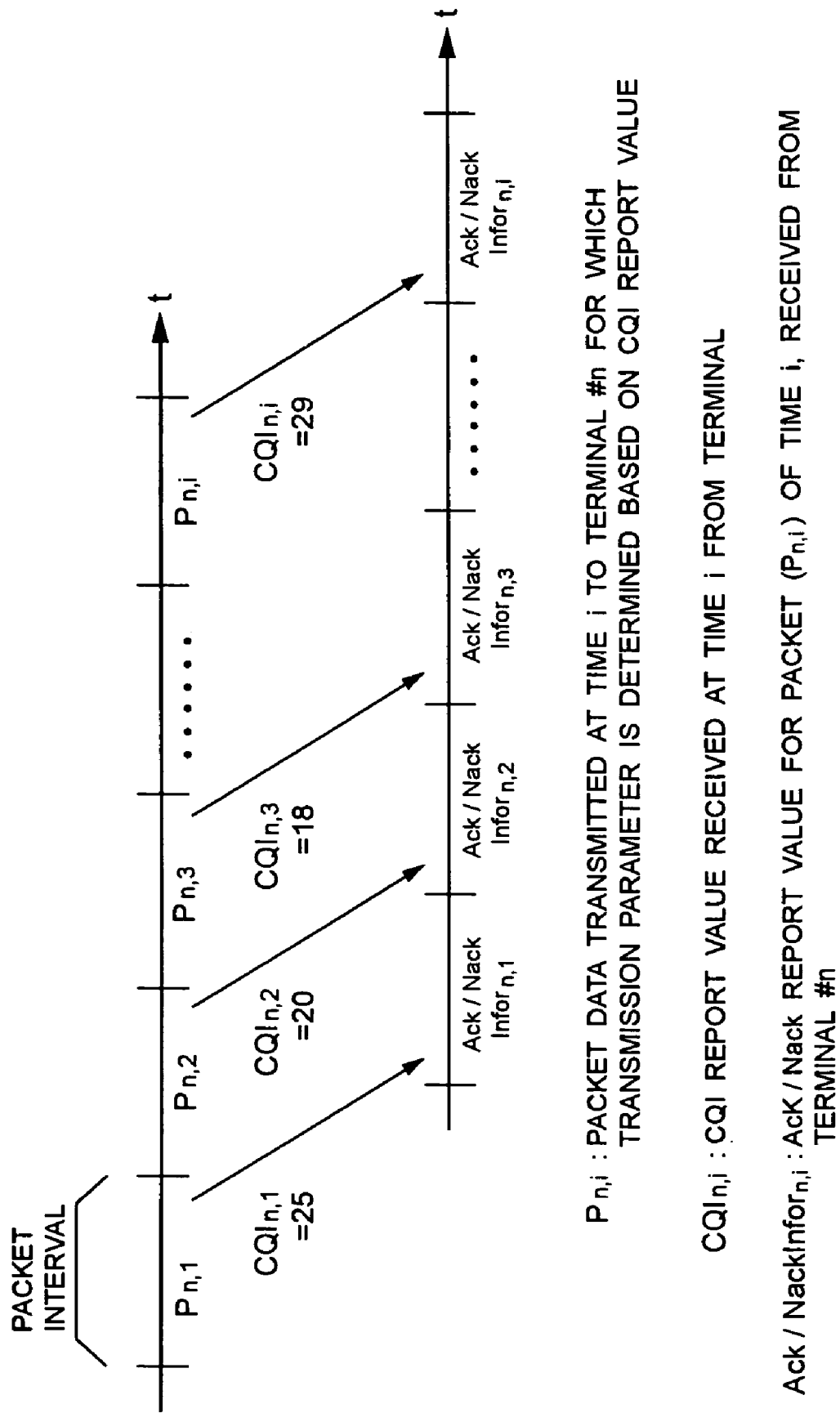
FIG. 2 is a diagram showing an example of CQI correction implemented at a radio base station of FIG. 1.

FIG. 2 is a diagram exemplarily showing correction of the CQI report value implemented at the radio base station 1 of FIG. 1. In FIG. 2, each horizontal axis represents time, where an upper case shows an assigning state of downlink packet data for the terminal #n and CQI information of the terminal (#n) 2-n received at time i and a lower case shows Ack (Acknowledgement)/Nack (Negative Acknowledgement) information of the terminal (#n) 2-n transmitted in the uplink.

Also in FIG. 2, the terminal (#n) 2-n demodulates/decodes packet data, and when CRC results in OK which means normal packet data reception, it is represented as Ack, but otherwise as Nack when CRC results in NG.

Since the radio link quality changes with time i, the CQI report value changes with time i. Accordingly, the transmission parameter of packet data to be assigned also changes. In this embodiment, it is possible to allocate a transmission opportunity to different terminals per packet interval so that packet data is transmitted to a terminal at the packet intervals.

Note here that FIG. 2 shows information only about the terminal (#n) 2-n which is assigned with the transmission opportunity. In practice, all the terminals (#1 to #n) 2-1 to 2-n operative for HSDPA and subordinate to the radio base station 1 transmit thereto the CQI information at fixed timings.

Also, the allocation of transmission opportunity is not limited to the terminal (#n) 2-n, and it is also allowable to schedule so that a terminal with higher radio link quality is allocated first among the terminals (#1 to #n) 2-1 to 2-n.

Figure 3:
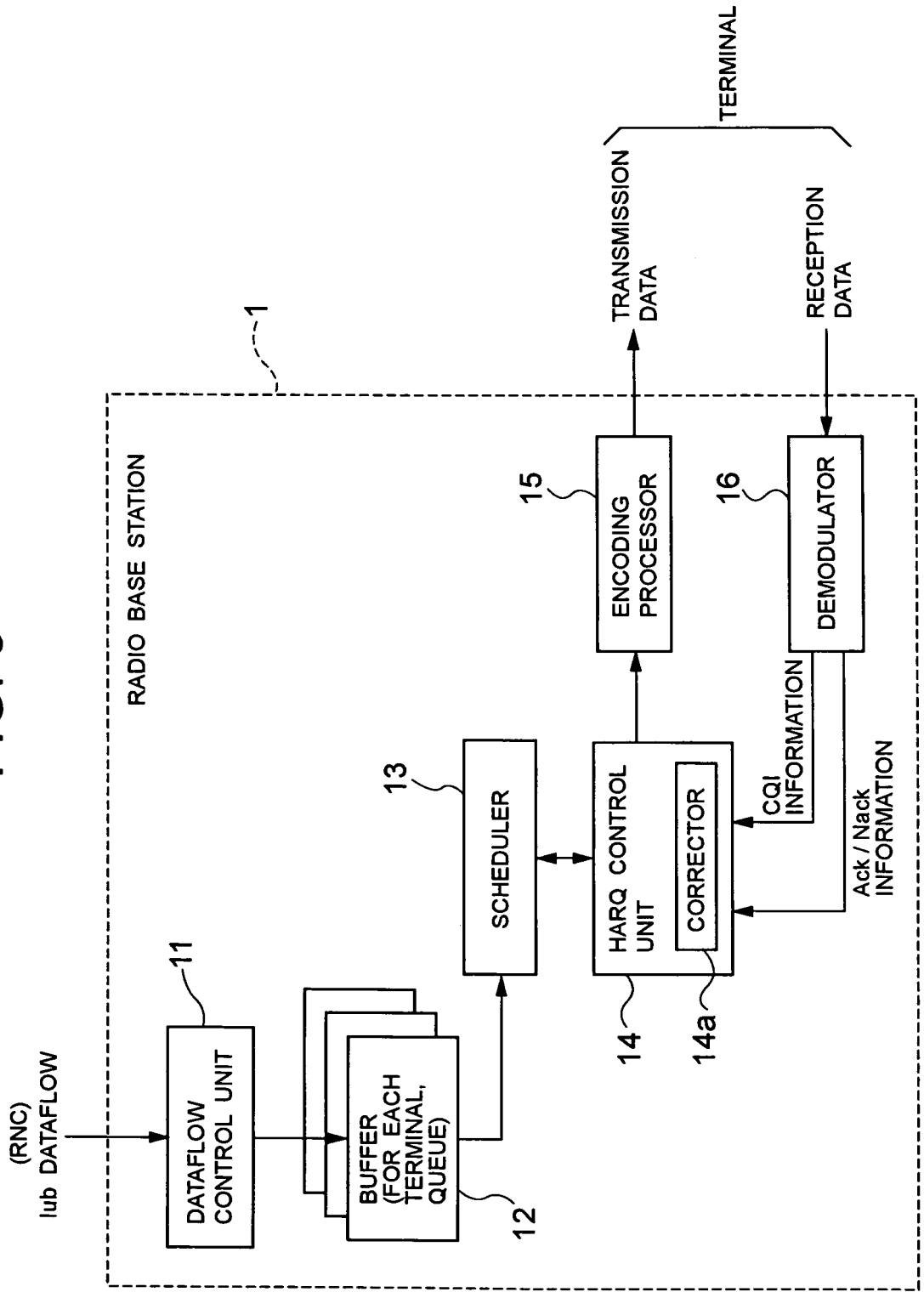
FIG. 3 is a block diagram showing a configuration of the radio base station of FIG. 1.

FIG. 3 is a block diagram showing a configuration of the radio base station 1 of FIG. 1, in accordance with HARQ (Hybrid Automatic Repeat reQuest) for retransmission control.

As shown in FIG. 3, the radio base station 1 comprises a dataflow control unit 11 which controls an Iub dataflow coming from the RNC 3, a buffer 12 which stores the dataflow for each terminal (#1 to #n) 2-1 to 2-n in each corresponding queue, a scheduler 13 which schedules the dataflow, an HARQ control unit 14 which controls retransmission of the dataflow, an encoding processor 15 which encodes the dataflow, and a demodulator 16 which demodulates data received from the terminals (#1 to #n) 2-1 to 2-n. The HARQ control unit 14 has a corrector 14a which corrects the aforementioned CQI report value.

Upon receipt of data from the terminals (#1 to #n) 2-1 to 2-n, the demodulator 16 demodulates the data and transfers CQI information and Ack/Nack information to the HARQ control unit 14. The corrector 14a of the HARQ control unit 14 corrects the aforementioned CQI report value through processing operations described later, on the basis of these CQI information and Ack/Nack information obtained from the demodulator 16.

Figure 8:
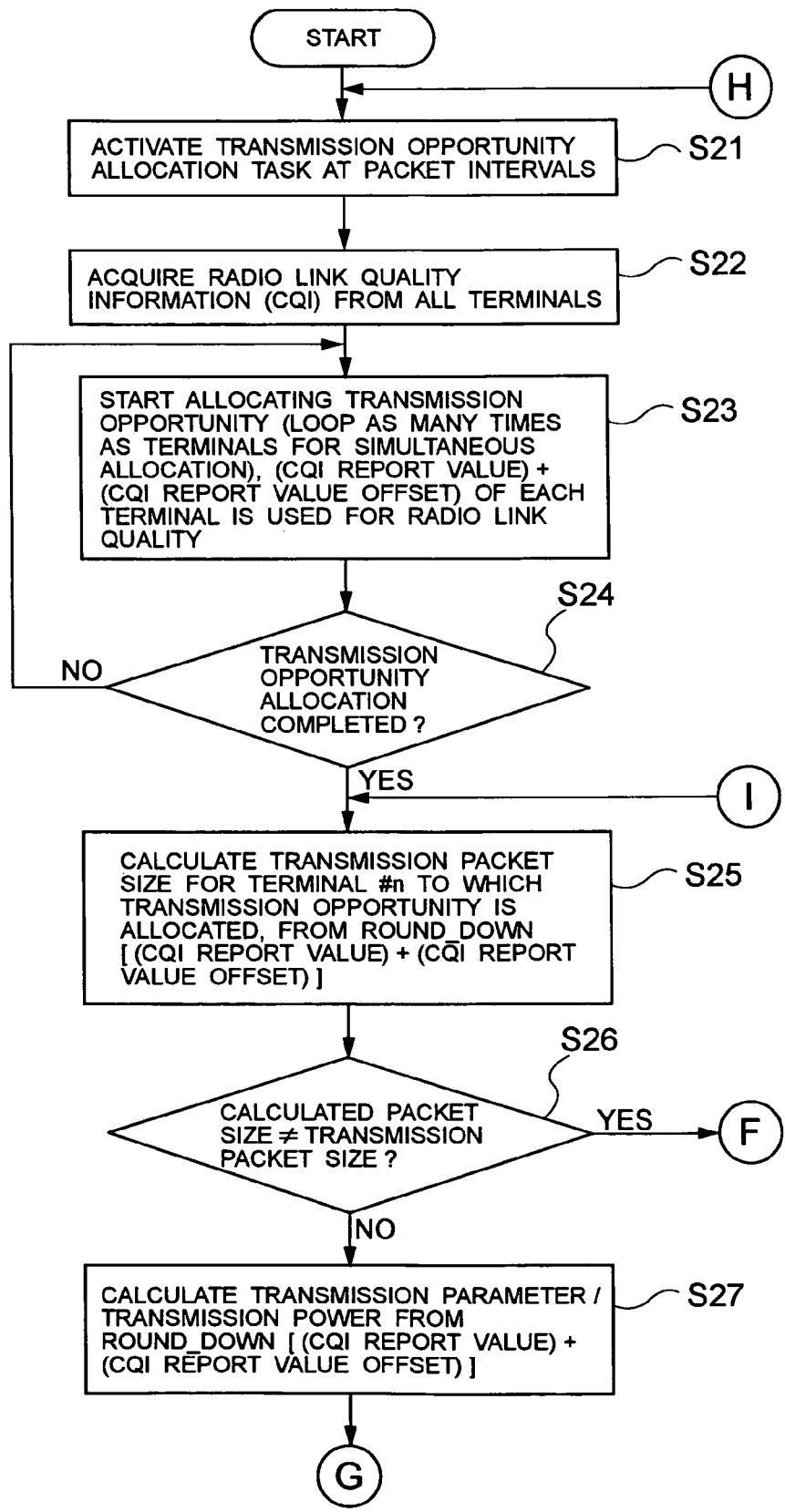
FIG. 8 is a flowchart showing a transmission opportunity allocating operation implemented at the radio base station of FIG. 1.
Figure 9:
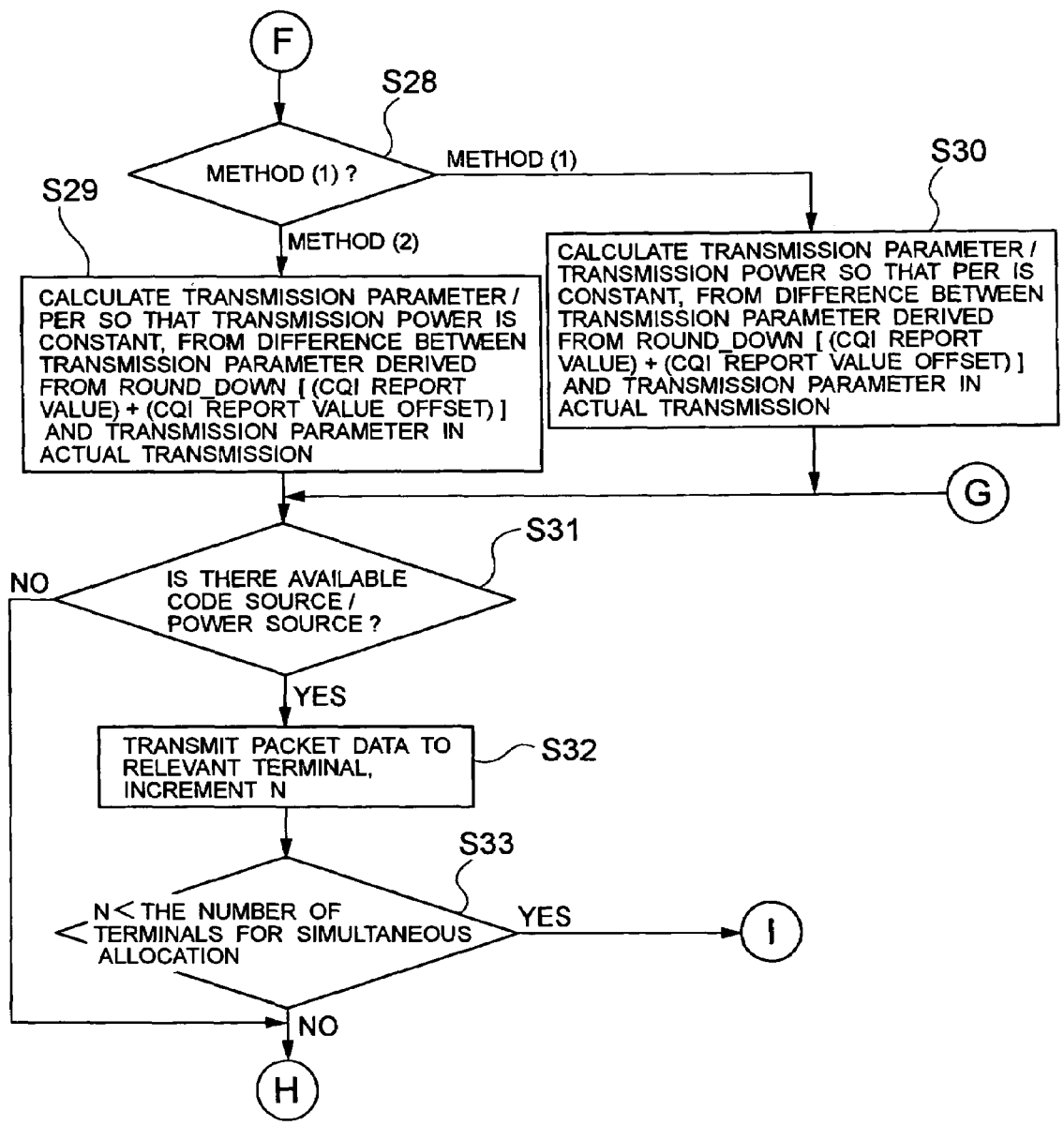
FIG. 9 is a flowchart showing the transmission opportunity allocating operation implemented at the radio base station of FIG. 1.
Figure 10:
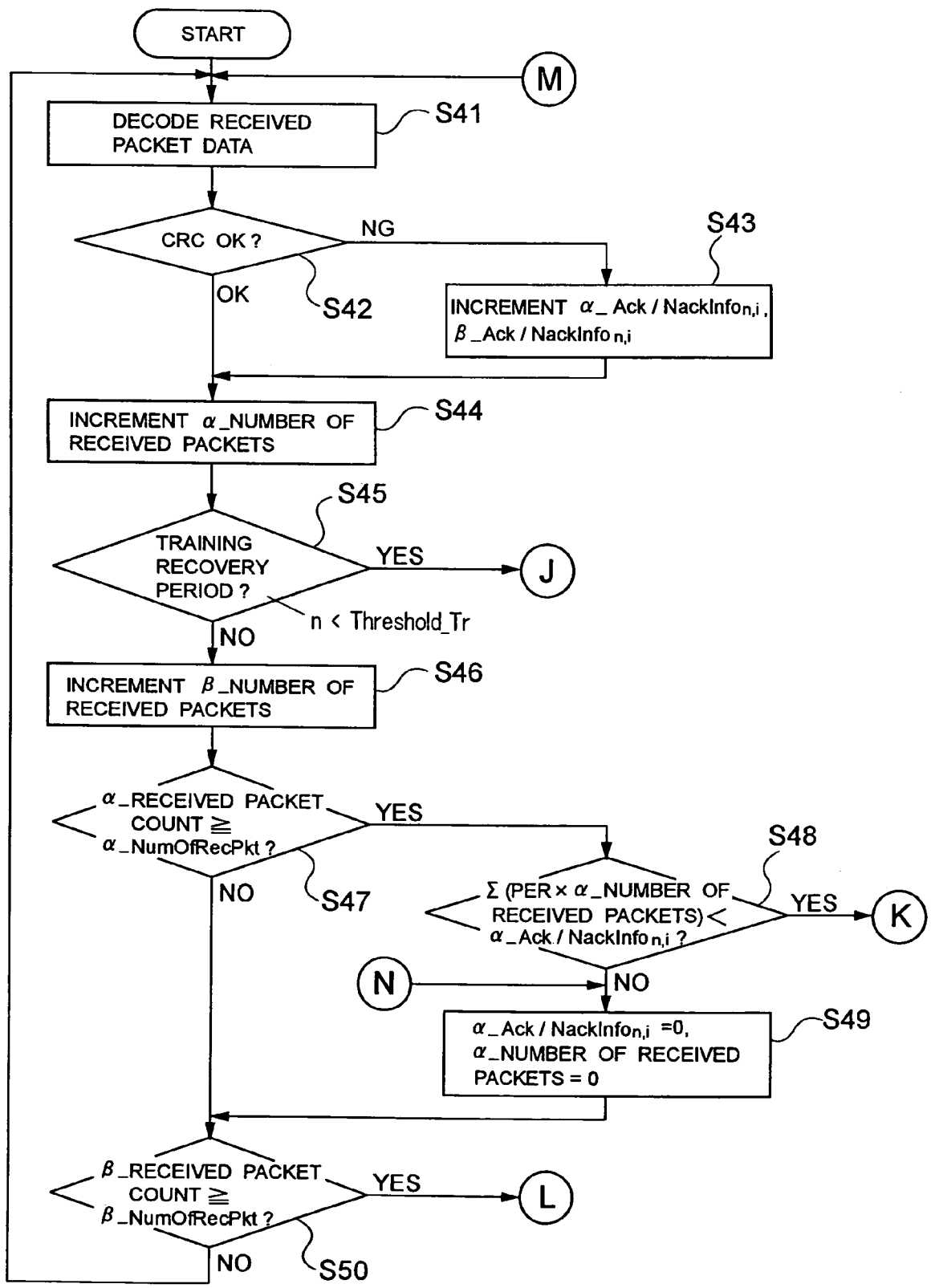
FIG. 10 is a flowchart showing a radio link quality correcting operation implemented at a terminal according to the other embodiment of the present invention.
Figure 11:
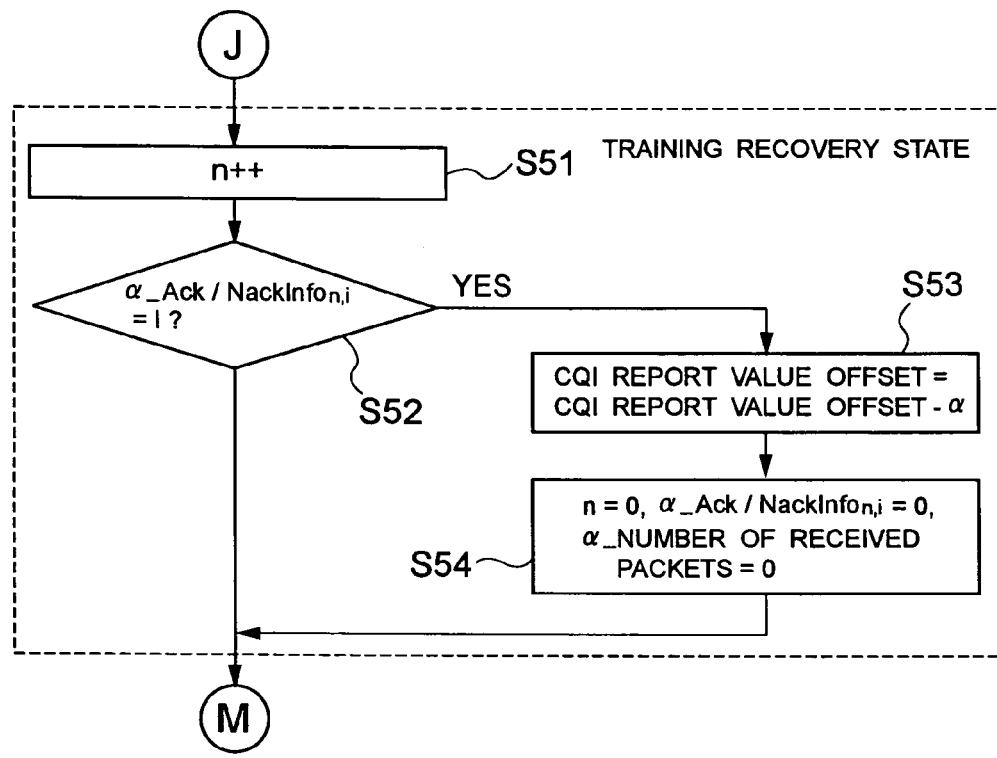
FIG. 11 is a flowchart showing the radio link quality correcting operation implemented at the terminal according to the other embodiment of the present invention.

FIGS. 4 to 7 are flowcharts illustrating a radio link quality correcting operation implemented at the radio base station 1 of FIG. 1, and FIGS. 8 and 9 are flowcharts showing a transmission opportunity allocating operation implemented at the radio base station 1 of FIG. 1. Referring to these FIGS. 1 to 9, descriptions will be made of operations of the radio communication system according to one embodiment of the present invention.

In FIGS. 4 to 9, "Pn,i" denotes packet data transmitted at time i to the terminal (#n) 2-n for which the transmission parameter is determined based on the CQI report value, "CQIn,i" denotes the CQI report value received from the terminal (#n) 2-n at time i, "α" denotes an offset value (α>0) [dB] deducted from the CQI report value, and "β" denotes an offset value (β>0)[dB] added to the CQI report value.

In the same drawings, "α_NumOfRecPkt" denotes a threshold of the number of times of receiving packets from the terminal (#n)2-n (which is used in a judgment expression for CQI report value offset−α), "β_NumOfRecPkt" denotes a threshold of the number of times of receiving packet from the terminal (#n)2-n (which is used in a judgment expression for CQI report value offset+β), and the "CQI report value offset" denotes a cumulative offset amount of correcting the CQI report value.

Furthermore, "α_Ack/NackInfo$_{n,i}$" denotes a cumulative value of Ack/Nack reports from the terminal (#n) 2-n regarding packet data ($P_{n,i}$) of time i (used in the judgment expression for CQI report value offset−α), which is incremented when CRC of the packet data results in NG.

Moreover, "β_Ack/NackInfo$_{n,i}$" denotes a cumulative value of Ack/Nack reports from the terminal (#n) 2-n regarding packet data ($P_{n,i}$) of time i (which is used in the judgment expression for CQI report value offset+β), which is incremented when CRC of the packet data results in NG.

In addition, "α_number of received packets" denotes the number of packets received by the terminal (#n)2-n (used in the judgment expression for CQI report value offset−α), and "β_number of received packets" denotes the number of packets received by the terminal (#n) 2-n (used in the judgment expression for CQI report value offset+β).

Furthermore, "Krec" denotes a coefficient multiplied by Σ(PER_exp×α_NumOfRecPkt) in determination as to whether to restore a recovery state. The coefficient is used to restore the state to the recovery state to shorten a period of time for which CRC continues to result in NG, when CRC of packet data frequently results in NG. And "Threshold_Tr" denotes a threshold as to whether to shift to a training recovery state.

Packet data ($P_{n,i}$) transmitted at time i from the radio base station 1 to the terminal (#n) 2-n is decoded by the terminal (#n) 2-n, and is then subjected to CRC check thereby to determine whether the transmitted packet data is correctly decoded or not.

When decoding is successful, the terminal (#n) 2-n returns Ack to the radio base station 1 in the uplink. When decoding is unsuccessful, the terminal (#n) 2-n returns Nack to the radio base station 1 in the uplink.

The terminal (#n) 2-n always measures downlink radio link quality. Using the results of the measurements, the terminal (#n) 2-n derives from the CQI table the transmission parameter and transmission power so that PER_exp of packet data is, for example, "0.1", and then informs the radio base station 1 of the derived result as the radio link quality (CQI) ($CQI_{n,i}$) in the uplink.

In this embodiment, since the radio base station 1 generates packet data in accordance with the parameter based on the CQI report value and transmits it to the terminal (#n) 2-n, "PER" can be expected to be 0.1. FIGS. 4 to 7 show a CQI correcting method for the terminal (#n) 2-n implemented at the radio base station 1.

Figure 4:
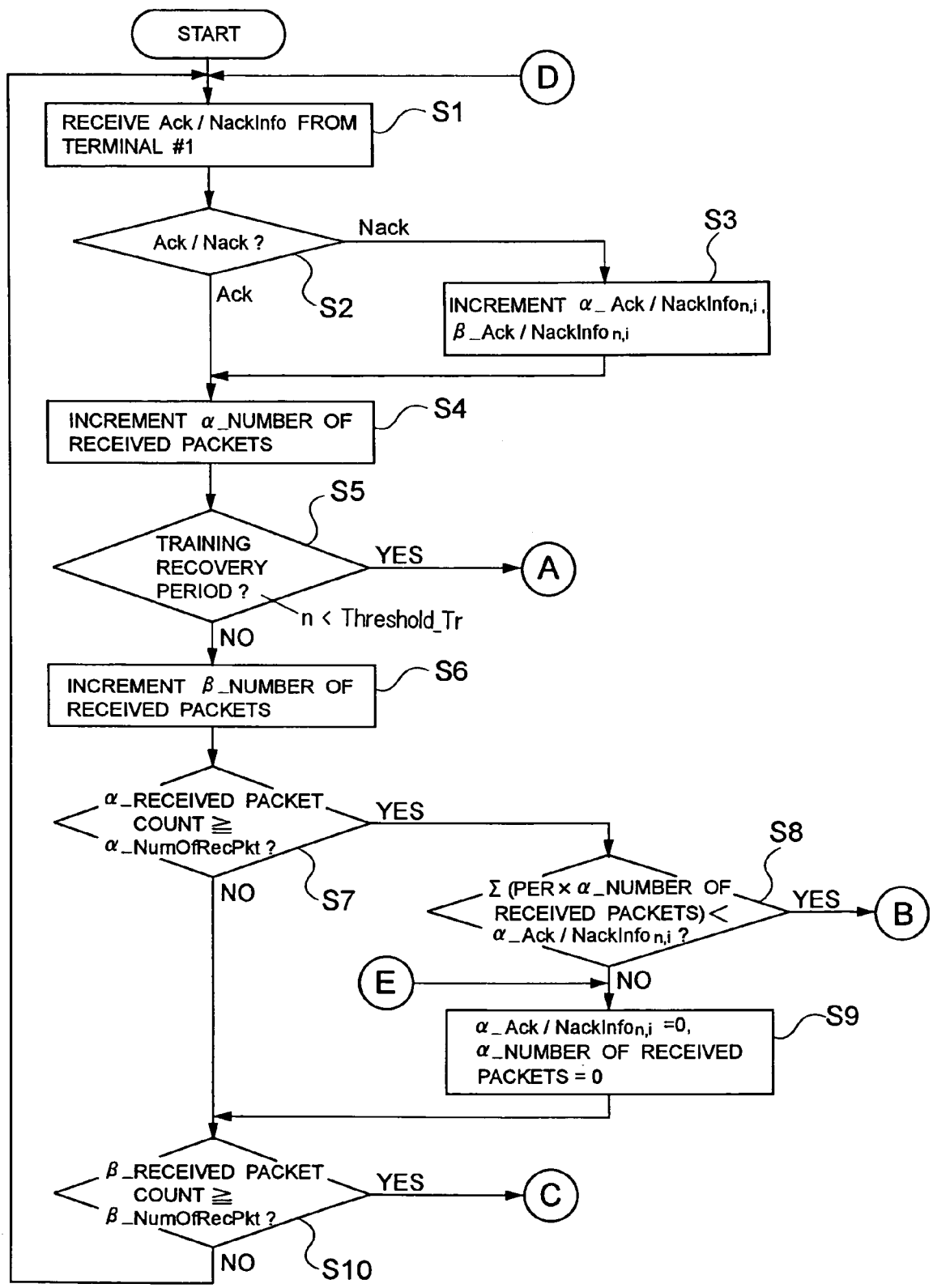
FIG. 4 is a flowchart showing a radio link quality correcting operation implemented at the radio base station of FIG. 1.
Figure 5:
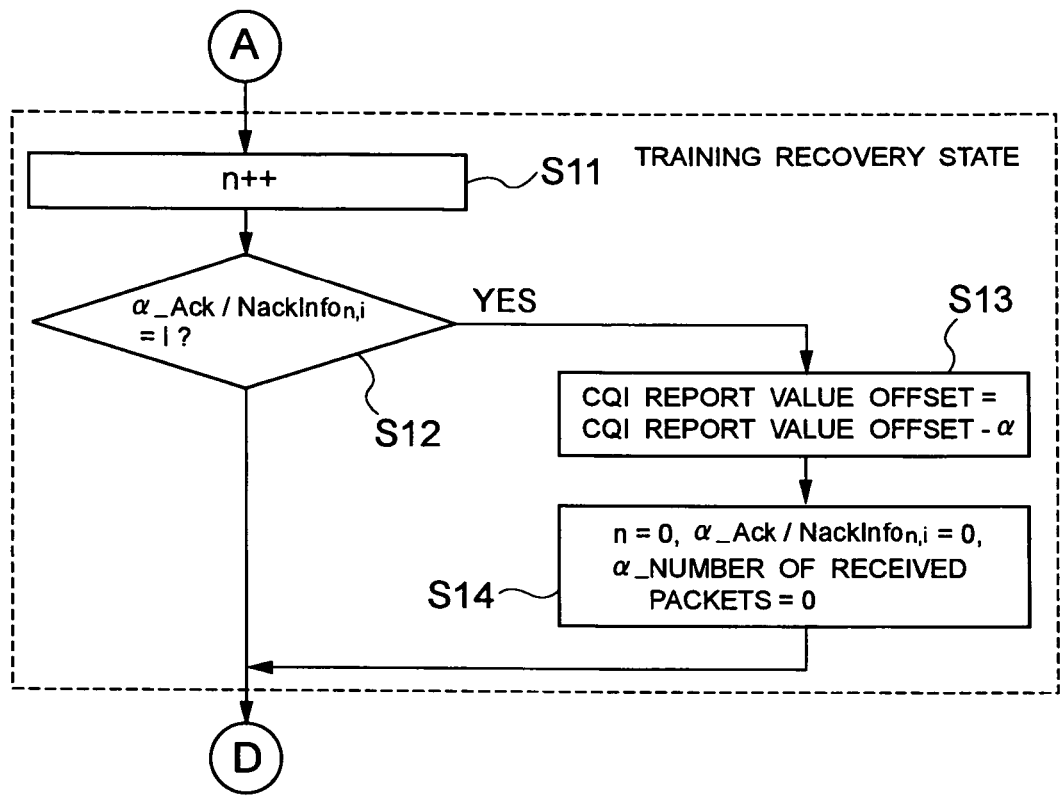
FIG. 5 is a flowchart showing the radio link quality correcting operation implemented at the radio base station of FIG. 1.

Every time of receipt of $Ack/NackInfo_{n,i}$ (steps S1, S2 and S5 in FIG. 4), the radio base station 1 increments the number of received packets (steps S4 and S6 in FIG. 4) and also increments the $Ack/NackInfo_{n,i}$ only in the case of Nack (step S3 in FIG. 4).

For example, assuming that "α_NumOfRecPkt=20" and "β_NumOfRecPkt=1000", the radio base station 1 expects that a result of addition for a time length of "α_NumOfRecPkt" is "2" because the radio base station 1 generates packet data so that "PER=0.1".

Figure 6:
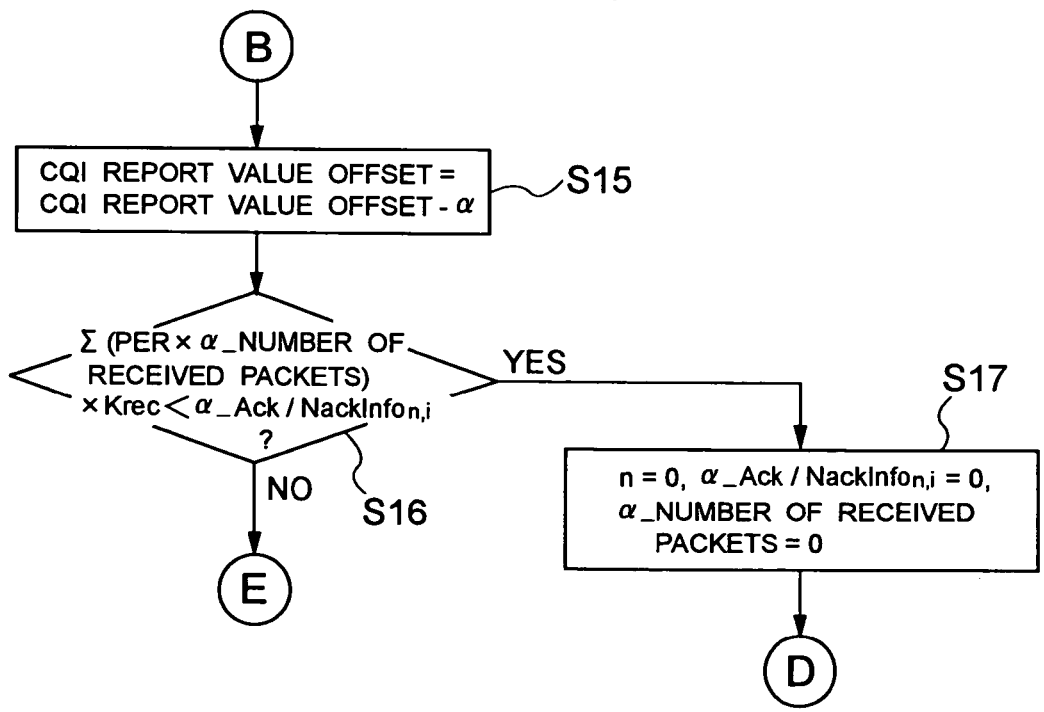
FIG. 6 is a flowchart showing the radio link quality correcting operation implemented at the radio base station of FIG. 1.
Figure 7:
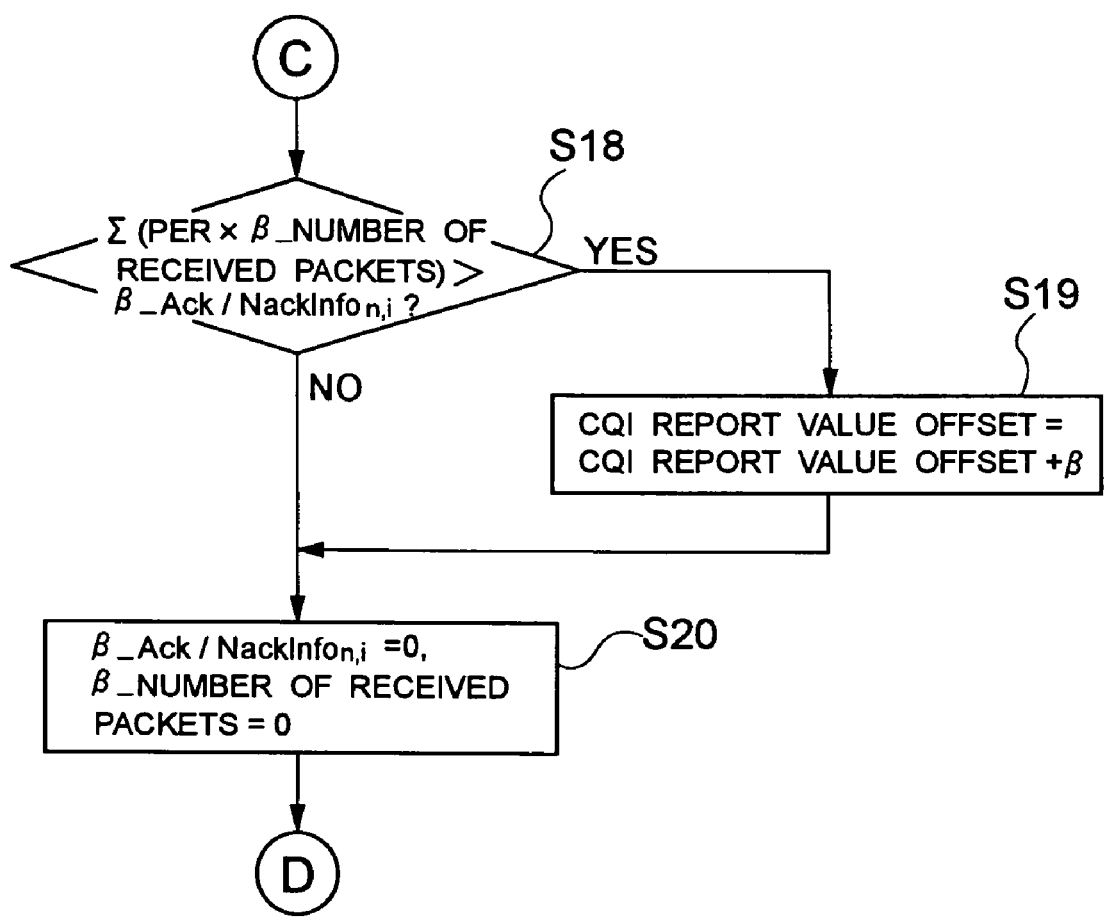
FIG. 7 is a flowchart showing the radio link quality correcting operation implemented at the radio base station of FIG. 1.

When the result of addition is larger than "2" (steps S7 and S8 in FIG. 4), the radio base station 1 adds "−α offsets" to "CQI report value offset" received from the terminal (#n) 2-n (step S15 in FIG. 6). In contrast, when a result of addition for a time length of "β_NumOfRecPkt" is smaller than "100" (step S18 in FIG. 7), the radio base station 1 adds "+β offset" (step S19 in FIG. 7).

The fractional portion of the CQI report value offset that represents cumulative values of α and β is used as a transmission power offset in relevant user transmission. The transmission power offset is defined as follows:

In the case of CQI report value offset>0, $$\text{Transmission power offset} = -(\text{unsigned a fractional portion of CQI report value offset}) \quad (1)$$

In the case of CQI report value offset≦0, $$\text{Transmission power offset} = (\text{unsigned a fractional portion of CQI report value offset}) - 1 \quad (2)$$

Accordingly, the transmission power offset is always determined within a range of −1<transmission power offset≦0.

Also, when the CQI table is referred to in determination of the transmission parameter, ROUND_DOWN[(CQI report value)+(CQI report value offset)] is used as a CQI value. Here, ROUND_DOWN ( ) means that a fractional portion of a value inside the parenthesis is discarded. Additionally, (CQI report value)+(CQI report value offset) is used as a CQI value in allocation of transmission opportunity (scheduling).

The α and β offset values are preferably from 0.1 dB to 0.5 dB. As these offset values become smaller, it takes longer to trace them, but as become higher, a large deflection width is presented thus yielding instability. Since "α_NumOfRecPkt" is preferably a smaller value, it is allowable to adopt a method of shortening a time period for which packets are not transferred, by providing a training recovery period shown in the flowchart (steps S11 to S14 in FIG. 5). Also, as a result of addition to $Ack/NackInfo_{n,i}$, "β_NumOfRecPkt" needs to be a large value in order to ensure some degree reliability of the estimated PER.

These are generally expressed by the following equations:

In the case of PER_exp×α_NumOfRecPkt<Σ(Ack/Nack-$Info_{n,i}$)(1≦i≦α_NumOfRecPkt), $$\text{CQI report value offset of terminal (\#n) 2-n is } -\alpha \quad (3)$$

In the case of PER_exp×β_NumOfRecPkt>Σ(Ack/Nack-$Info_{n,i}$)(1≦i≦β_NumOfRecPkt), $$\text{CQI report value offset of terminal (\#n) 2-n is } +\beta \quad (4)$$

The above operations provide more effectiveness when implemented at the side of the terminals (#1 to #n) 2-1 to 2-n. Because implementation of the above operations in the radio base station 1 requires notification of Ack/Nack information in the uplink to utilize this information. This may cause deterioration of correction accuracy if the radio base station 1 receives Ack/Nack information accidentally.

The radio base station 1 is not necessarily able to generate packet data in accordance with a transmission parameter obtained according to ROUND_DOWN[(CQI report value)+(CQI report value offset)](a parameter which satisfies PER_exp=0.1) that is informed by the terminal (#n) 2-n. In order to solve this problem, the following two methods are provided. The processing operations thereof are shown in FIGS. 8 and 9.

In the first method (1) (steps S21 to S26 in FIG. 8 and step S28 in FIG. 9), a power ratio between a transmission power in the case where packets has been transmitted with a transmission parameter set according to the corrected CQI report value and a transmission power based on a transmission parameter in actual packet transmission is determined, and the transmission parameter and transmission power are then adjusted using the determined ratio so that "PER_exp=0.1" (step S30 in FIG. 9).

Figure 12:
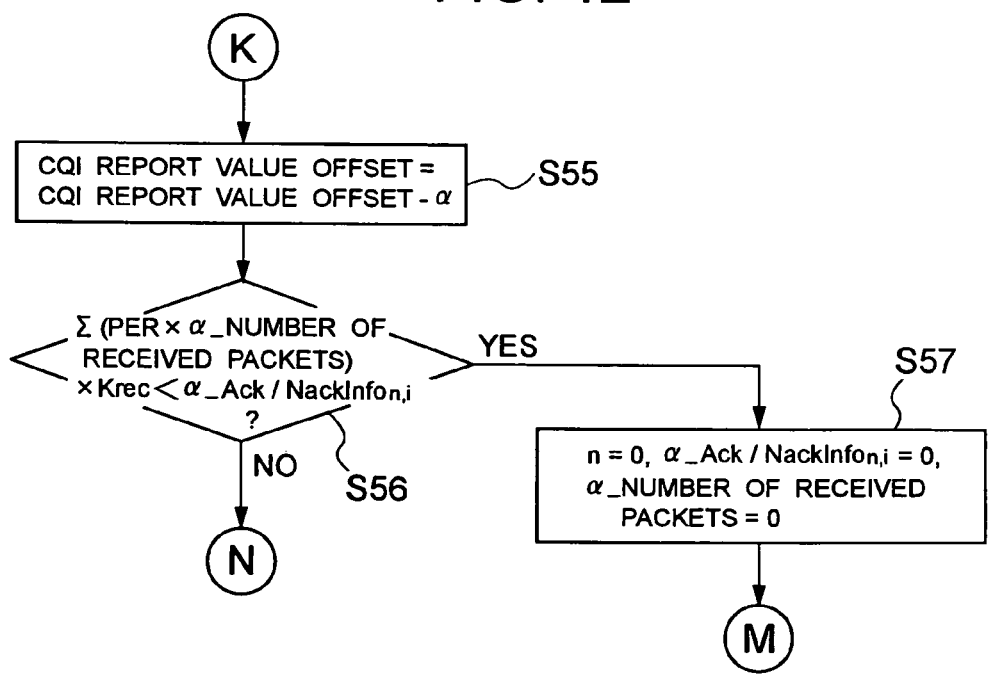
FIG. 12 is a flowchart showing the radio link quality correcting operation implemented at the terminal according to the other embodiment of the present invention.
Figure 13:
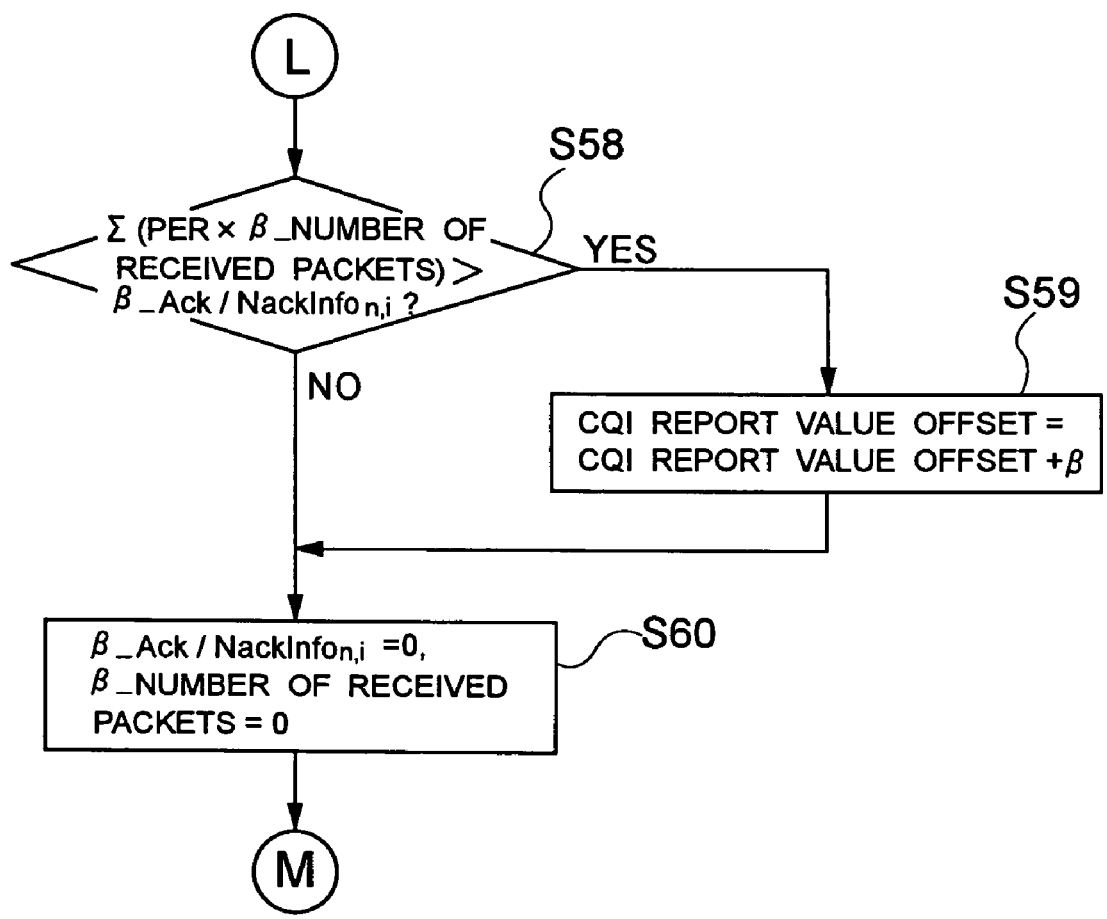
FIG. 13 is a flowchart showing the radio link quality correcting operation implemented at the terminal according to the other embodiment of the present invention.

More specifically, assuming that "$CQI_{n,i}$=23" is received from the terminal (#n) 2-n at time "1" on the CQI table shown in FIG. 16, the transmission parameter at this moment shows "the number of Codes:7", "modulation scheme: 16 QAM (Quadrature Amplitude Modulation)" and "data size: 9719 bits", as is seen from FIG. 12.

It is assumed again that the terminal (#n) 2-n is allocated at this time "1" with a transmission opportunity of packet data. When data to be transmitted to the terminal (#n) 2-n has the size of 8000 bits, a change in an encoding rate due to the data size differences is used as an offset of the transmission power if either the number of codes or modulation scheme is not changed, and the data is transmitted so that "PER_exp=0.1".

Likewise, if the number of codes or modulation scheme is changed, the change in the encoding rate is used as an offset value of the transmission power, and the data is transmitted so that "PER_exp=0.1", so as thereby to correct the CQI report value using the described equations (3) and (4).

In the second method (2) (step S28 in FIG. 9), a PER_exp value is calculated in advance when the number of codes, modulation system, and the like, are changed, and left parts of the equations (3) and (4): "PER_exp×α_NumOfRecPkt", "PER_exp×β_NumOfRecPkt" are replaced with as follows:

In the case of Σ(PER_exp(i))<Σ(α_$Ack/NackInfo_{n,i}$)(0≦i≦NumOfRecPkt_α), $$\text{CQI report value offset of the terminal (\#n) 2-n is } -\alpha \quad (5)$$

In the case of Σ(PER_exp(i))>Σ(β_Ack/NackInfon,i) (0≦i≦NumOfRecPkt_β), $$\text{CQI report value offset of the terminal (\#n) 2-n is } +\beta \quad (6)$$

Thereby the correction of the CQI report value is realized (step S29 in FIG. 9).

In this case, a probability regarding packet data (PER expectation value) needs to be notified to the terminals (#1 to #n) 2-1 to 2-n in some way. The advance calculation may be made for the transmission power offset value or PER_exp value in the case where the encoding rate is changed due to the transmission parameter difference, thereby to prepare a table.

The conventional technology uses a radio communication channel with limited radio resources of codes or transmission power to transmit packet data. Therefore, the inaccurate report of radio link quality may adversely lead to excessive resource allocation thereby reducing system throughput, or lead to discard of packet data due to insufficient resource allocation thereby lowering user throughput.

By contrast, this embodiment allows correction of radio link quality using a prior probability (if known in advance) that CRC of transmitted packet data results in OK/NG (expectation value of packet error rate), so that reduction in user throughput and system throughput can be prevented.

Figure 14:
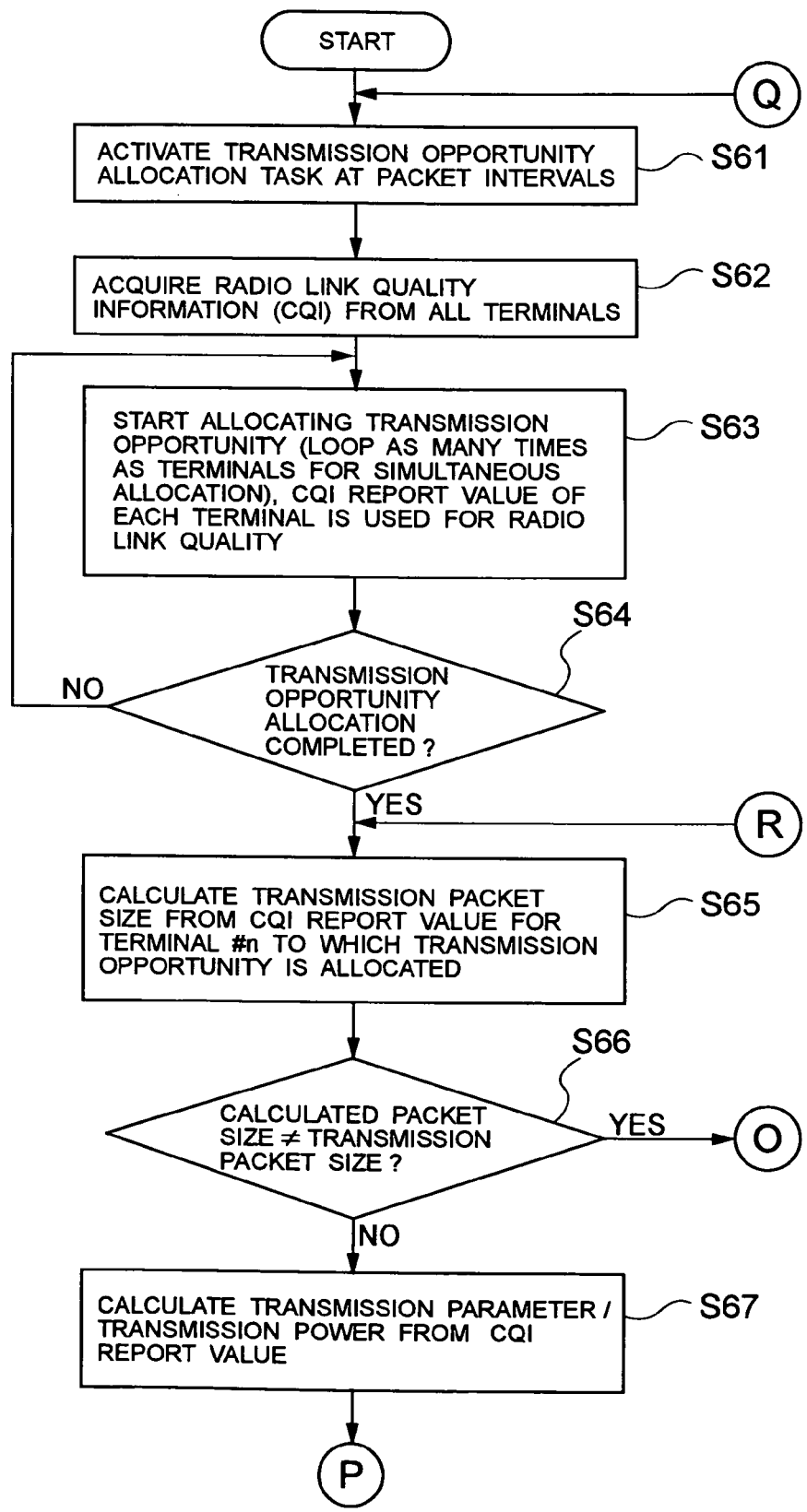
FIG. 14 is a flowchart showing a transmission opportunity allocating operation implemented at the radio base station according to the other embodiment of the present invention.
Figure 15:
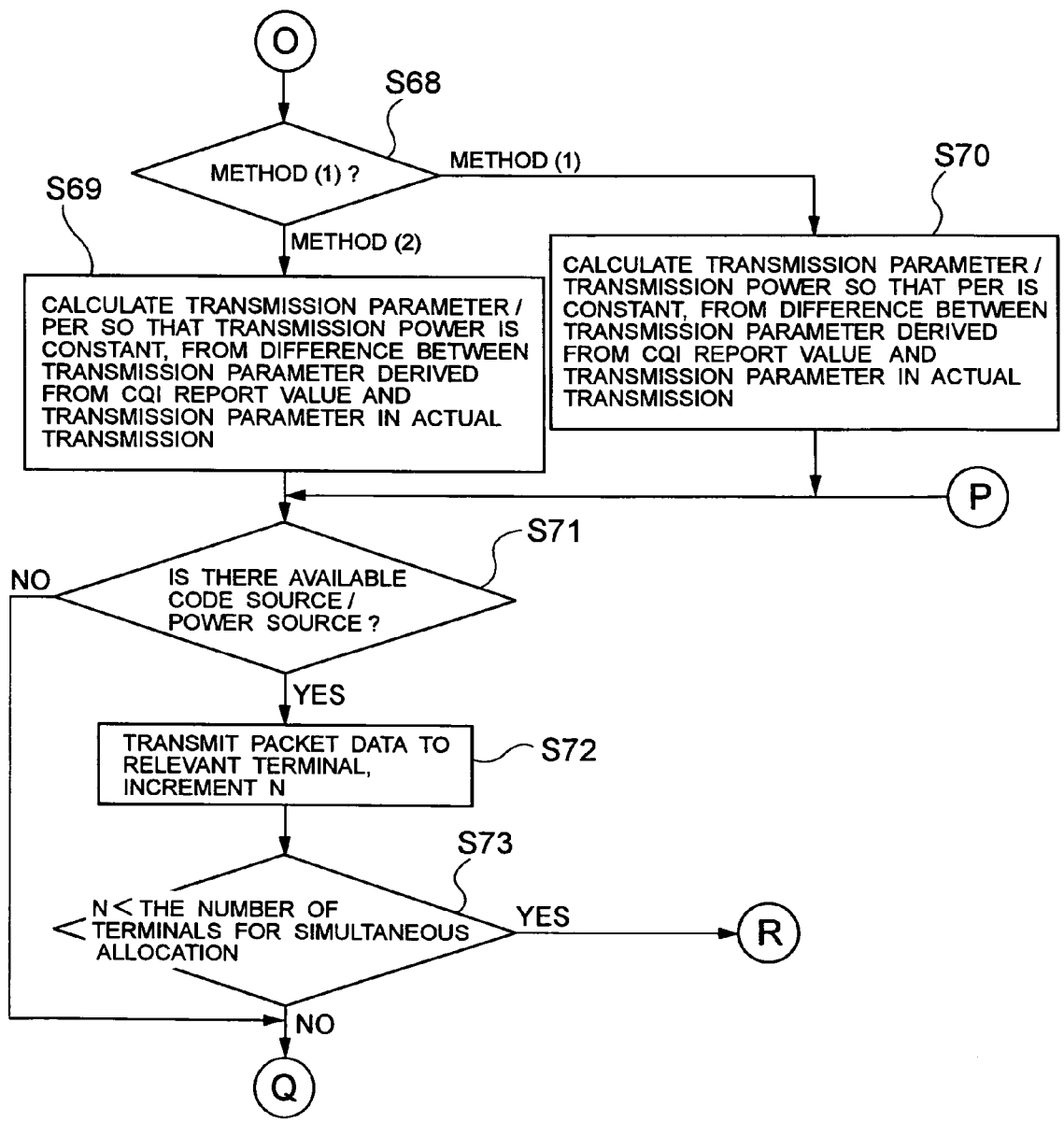
FIG. 15 is a flowchart showing the transmission opportunity allocating operation implemented at the radio base station according to the other embodiment of the present invention.
Figure 17:
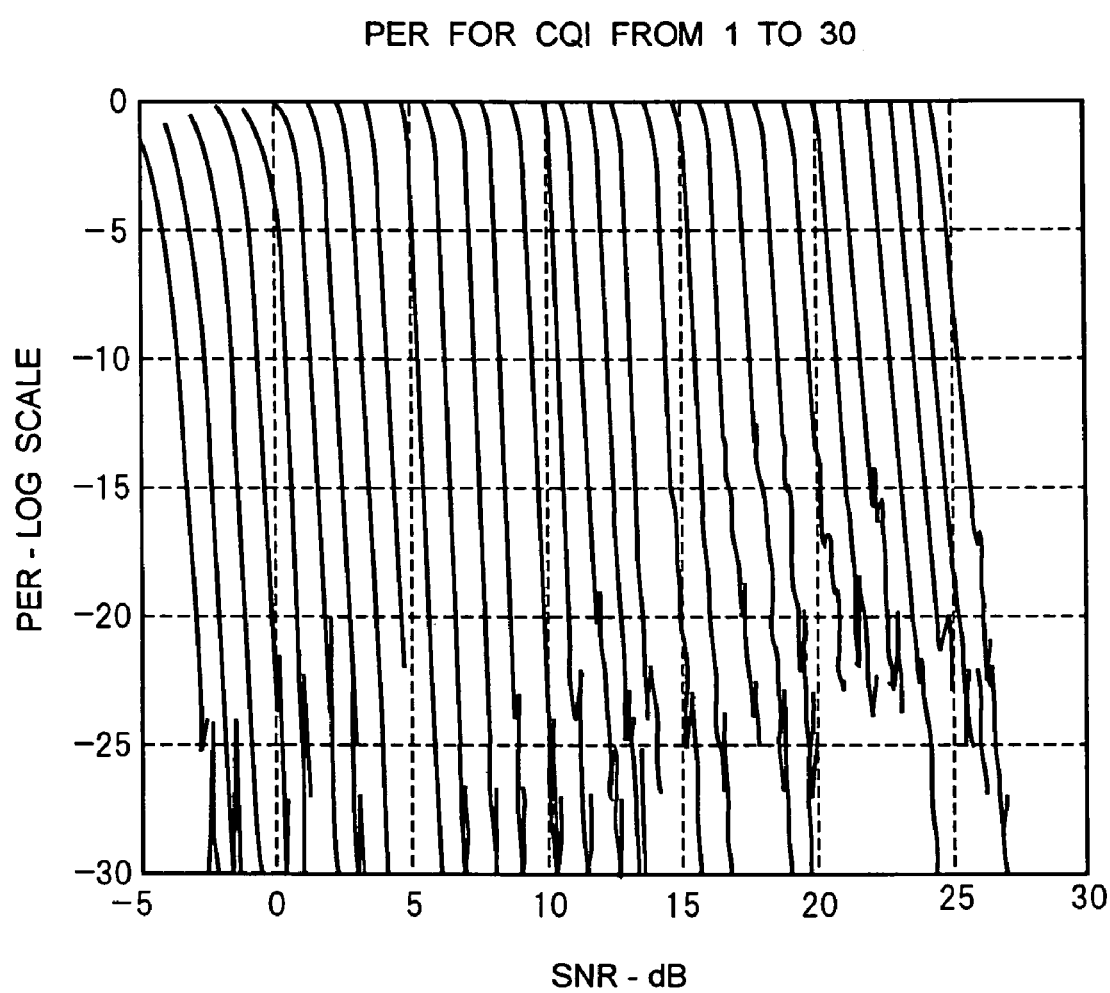
FIG. 17 is a diagram showing a Log (PER)-SNR curve for each CQI value.

FIGS. 10 to 13 are flowcharts showing a radio link quality correcting operation implemented at a terminal according to the other embodiment of the present invention, and FIGS. 14 and 15 are flowcharts showing a transmission opportunity allocating operation implemented at a radio base station according to the other embodiment of the present invention. The structures of the radio communication system and radio base station according to the other embodiment of the present invention are the same as the structure of the radio communication system shown in FIG. 1 and the structure of the radio base station shown in FIG. 3, respectively, according to the one embodiment of the present invention. Difference resides in that the radio link quality correcting operation is performed by the terminal in the other embodiment while the radio link quality correcting operation is performed in a radio base station in one embodiment.

Accordingly, each of steps S41 to S60 of the radio link quality correcting operation shown in FIGS. 10 to 13 is identical to steps S1 to S20 of the radio link quality correcting operation performed by the radio base station shown in FIGS. 4 to 7 according to the one embodiment of the present invention, so the descriptions of those steps S41 to S60 will be omitted.

Furthermore, each of steps S61 to S73 in FIGS. 14 and 15 of the transmission opportunity allocating operation performed by the radio base station differs only in that the CQI report value offset is not used and is basically identical to steps S21 to S33 in FIGS. 8 and 9 of the transmission opportunity allocating operation implemented at the radio base station according to the one embodiment of the present invention, so the description of those steps S61 to S73 will be omitted. In these steps, the CQI report value offset is used at the terminal and is thus not used in steps S63, S65 and S67 in FIG. 14 and steps S69 and S70 in FIG. 15.

In this embodiment, similarly to the one embodiment previously described, a prior probability that CRC of the transmitted packet data results in OK/NG is used for correcting the radio link quality if it is known in advance, thereby preventing the reduction in user throughput and system throughput. Furthermore in this embodiment, the radio link quality correcting operation performed at the terminal offers more effectiveness than that in the previously mentioned one embodiment of the present invention.

As described above, the present invention has the foregoing structure and operations, and thus provides an effect that reduction in user throughput and system throughput can be prevented.

What is claimed is:

1. A radio communication system, in which data transmitting and receiving is achieved between a base station and a mobile station based on radio link quality and data delivery confirmation informed from the mobile station to the base station, wherein the base station comprises means for correcting the radio link quality in accordance with an expectation value of a packet error rate of packet data to be transmitted to the mobile station and a packet error rate of packet data actually received by the mobile station, wherein when the packet error rate of the received packet data is larger than a preset threshold value, the mobile station provides a recovery period in which a CQI (Channel Quality Indicator) report value offset is made smaller at every detection of error in the received packet data.

2. A radio communication system, in which data transmitting and receiving is achieved between a base station and a mobile station based on radio link quality and data delivery confirmation informed from the mobile station to the base station, wherein the base station comprises means for correcting the radio link quality in accordance with an expectation value of a packet error rate of packet data to be transmitted to the mobile station and a packet error rate of packet data actually received by the mobile station, wherein upon start of assignment of the packet data, the mobile station provides a training period in which the CQI (Channel Quality Indicator) report value offset is made smaller at every detection of error in the received packet data.

3. A radio communication system, in which data transmitting and receiving is achieved between a base station and a mobile station based on radio link quality and data delivery confirmation informed from the mobile station to the base station, wherein the base station comprises means for correcting the radio link quality in accordance with an expectation value of a packet error rate of packet data to be transmitted to the mobile station and a packet error rate of packet data actually received by the mobile station, wherein the base station adjusts the radio link quality by determining a power ratio between a transmission power in the case of transmission with a parameter according to a CQI (Channel Quality Indicator) report value corrected and a transmission power of a parameter in actual transmission.

4. A base station for transmitting and receiving data to and from a mobile station based on radio link quality and data delivery confirmation informed by the mobile station, comprising:

means for correcting the radio link quality in accordance with an expectation value of a packet error rate of packet data to be transmitted to the mobile station and a packet error rate of packet data actually received by the mobile station, wherein the radio link quality is adjusted by determining a power ratio between a transmission power in the case of transmission with a parameter according to a CQI (Channel Quality Indicator) report value corrected and a transmission power of a parameter in actual transmission.

5. A method of correcting radio link quality information of a radio communication system in which data transmitting and receiving is achieved between a base station and a mobile station based on radio link quality and data delivery confirmation informed from the mobile station to the base station, the method comprising:

a step executed by the base station of correcting the radio link quality in accordance with an expectation value of a packet error rate of packet data to be transmitted to the mobile station and a packet error rate of packet data actually received by the mobile station, wherein a recovery period is provided at the mobile station when the packet error rate of the received packet data is larger than a preset threshold value, the recovery period being utilized to make a CQI (Channel Quality Indicator) report value offset smaller at every detection of error in the received packet data.

6. A method of correcting radio link quality information of a radio communication system in which data transmitting and receiving is achieved between a base station and a mobile station based on radio link quality and data delivery confirmation informed from the mobile station to the base station, the method comprising:

a step executed by the base station of correcting the radio link quality in accordance with an expectation value of a packet error rate of packet data to be transmitted to the mobile station and a packet error rate of packet data actually received by the mobile station, wherein a training period is provided at the mobile station upon start of assignment of the packet data, the training period being utilized to make the CQI (Channel Quality Indicator) report value offset smaller at every detection of error in the received packet data.

7. A method of correcting radio link quality information of a radio communication system in which data transmitting and receiving is achieved between a base station and a mobile station based on radio link quality and data delivery confirmation informed from the mobile station to the base station, the method comprising:

a step executed by the base station of correcting the radio link quality in accordance with an expectation value of a packet error rate of packet data to be transmitted to the mobile station and a packet error rate of packet data actually received by the mobile station, a step executed by the base station of adjusting the radio link quality by determining a power ratio between a transmission power in the case of transmission with a parameter according to a CQI (Channel Quality Indicator) report value corrected and a transmission power of a parameter in actual transmission.

* * * * *